July 17, 1962 W. D. VAN DYKE 3,045,075
HIGH SPEED COMMUTATOR SWITCH
Filed March 20, 1959 3 Sheets-Sheet 1

INVENTOR.
WILLIAM D. VAN DYKE
BY
Edwin Coates
-ATTORNEY-

July 17, 1962 W. D. VAN DYKE 3,045,075
HIGH SPEED COMMUTATOR SWITCH
Filed March 20, 1959 3 Sheets-Sheet 3
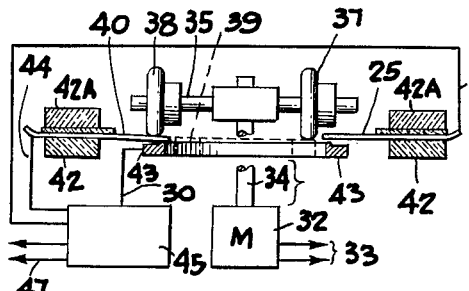
Fig. 3.
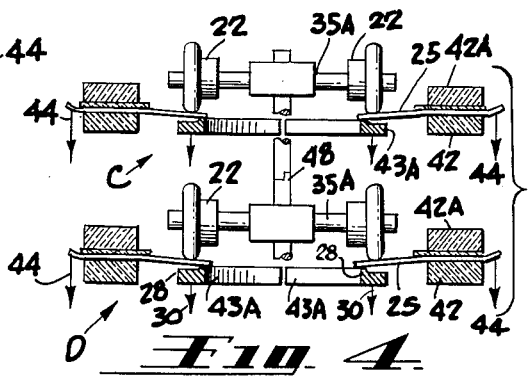
Fig. 4.
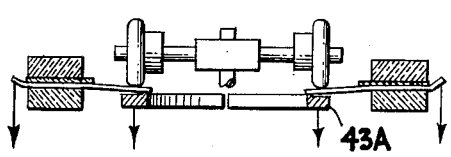
Fig. 8.
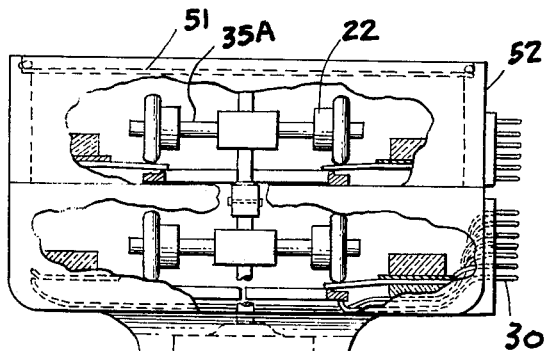
Fig. 7
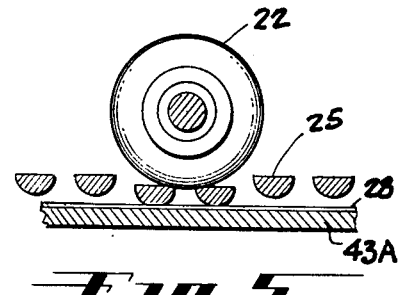
Fig. 5.
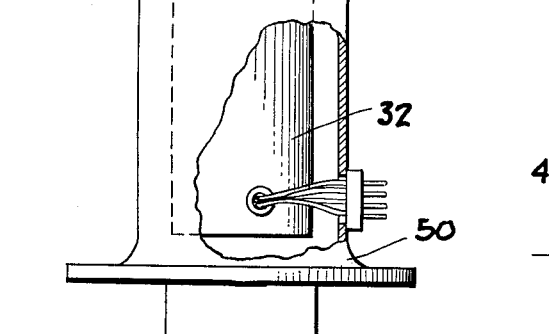
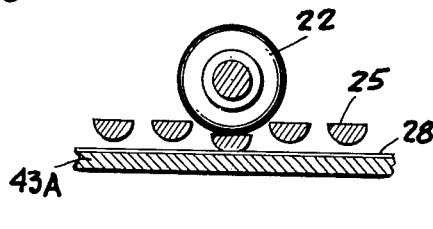
Fig. 6
INVENTOR.
WILLIAM D. VAN DYKE
BY Edwin Coates
- ATTORNEY- – Patented July 17, 1962

3,045,075
HIGH SPEED COMMUTATOR SWITCH
William D. Van Dyke, Santa Monica, Calif., assignor to Douglas Aircraft Company, Inc., Santa Monica, Calif.
Filed Mar. 20, 1959, Ser. No. 800,842
5 Claims. (Cl. 200—24)

This invention deals with multiplex-switching and is particularly concerned to provide ultra-high speed multiplex switching of microvolt and microampere signals.

In such apparatus, a large number of signals of small voltage have to be rapidly switched from the multiplicity of various signal sources successively into, for example, data displaying and/or processing means, or the like, according to a predetermined system of programming.

It is common place to encounter objections to the effects of the noisiness of previous such switches, which noises are inevitably transmitted into the associated, or adjacent, electronic apparatus, to the obvious detriment of the accuracy of the electronic apparatus. For, in many instances these operational noises are of such amplitude, compared to that of the signals being "processed," as to detrimentally affect the accuracy of the data displayed or recorded by the system.

Equally objectionable is the previous excessive arcing upon making and breaking "contact" in the previous multiplexing switches. Such arcing results in potential drop and, eventually, in such wear of the contacts as to quite seriously reduce the efficacy of the switch.

The present invention, among other achievements, materially reduces the noise of switching in ultra high-speed commutator-type multiplex-switches and does so to such an extent that no detrimental noise pick-up effects are observed in associated electronic apparatus.

Arcing sufficient to cause appreciable potential drop is eliminated, either upon making or upon breaking the multiplicity of high-speed contacts. Wearing of these contacts thus is also minimized.

No sort of amplifying means at all are mandatory in connection with the present high-speed multiplexing switch.

Generally to achieve these, and other ends the device essentially comprises an annular bus member, and a plurality of mutually spaced contact rods or reeds running radially with reference thereto. This plurality of mutually spaced, reed-like, cantilever mounted contact rods, is mounted circularly super-adjacent the bus and radially approaching same from all directions. A non-conductive pressure-roller is mounted to revolve circularly super-adjacent, or sub-adjacent, as desired, the annularly arranged, radially extending reeds in pressural contact therewith. Each reed is connected to a signal representing a variable to be programmed. The annular bus has one take-off contact connected to a computer or other data process and display means, to successively feed into the latter the signals fed to the bus bar by the roller's forcing the reeds into contact with the bus.

It is also of the essence of the invention that no wiping or sliding contact or switching, or any other type of switching involving internal or external molecular friction, be involved. Further, the period of natural vibration, or the natural frequency, of the reeds is herein pre-calibrated with the ultra high rate of microvolt switching and this frequency hence is contemplated herein as being definitively high. Thus, in one species of the invention no reed makes contact before the other reeds have "sprung up" out of contact with the bus bar.

Several of the now-contemplated embodiments of the inventive concepts are representationally shown in the accompanying drawings and each will be described hereinafter in conjunction with these drawings. It is to be understood, however, that these drawings and this description are typical, merely, and for the sole purpose of rendering the disclosure of the concepts more concrete.

In these drawings:

FIG. 3 is a diagrammatic view, mainly in vertical section, of a variant of the foregoing embodiment, also showing the signals-source and transmitter of the switched signals to a conjoined signal-using device, as well as the driving motor for the sweep arm;

FIG. 4 is a diagrammatic view, mainly in vertical section of a double deck variant, each deck including a bi-polar switch;

FIG. 5 is a fragmentary detail view of a "make-before-break" arrangement of the "reeds" with respect to each other and to the actuating means for closing the various circuits herein;

FIG. 6 is a similar view of a "break-before-make" arrangement of the reeds with respect to each other and the actuating means;

FIG. 7 is a side elevational view, partly broken away, of a substantially complete article of manufacture incorporating the double deck, bi-polar, or split-bus, variant, and FIG. 8 is a variant consisting of a single-deck, bi-polar, or split-ring switch.

Figure 1:
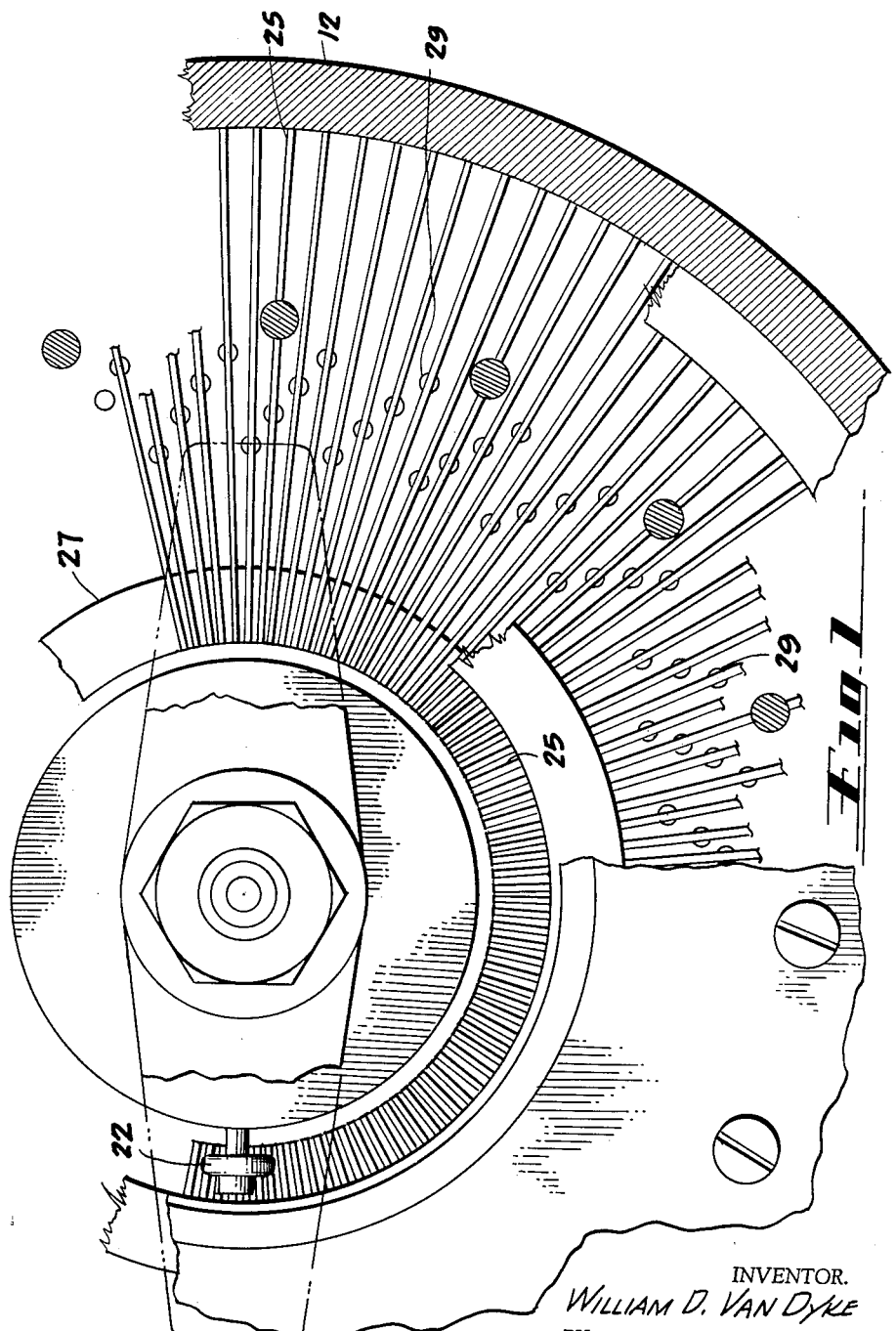
FIG. 1 is a fragmentary view, partly in horizontal section and partly in plan, of a certain embodiment of the inventive concepts.
Figure 2:
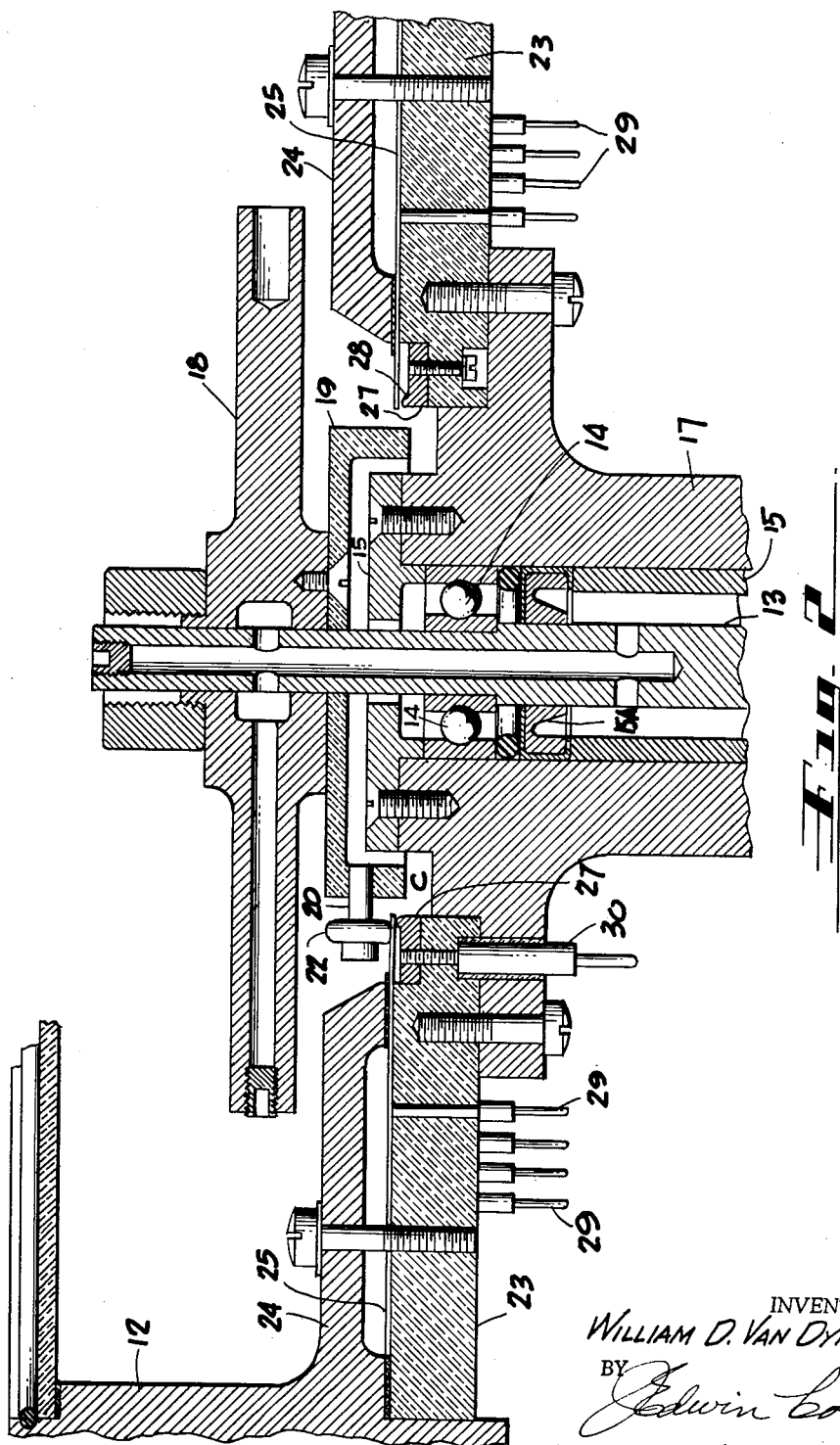
FIG. 2 is a fragmentary, vertical, substantially central section of the foregoing embodiment.

Referring first to the species shown in FIGS. 1 and 2, the construction includes a cylindric casing 12 centrally coaxially of which extends a drive shaft 13. The shaft is rotatably mounted and supported at its upper end by means of a ball, or other, bearing 14, supported by the upper end of a sleeve arrangement and clamping means 15 and sealed against dust by dust seals 15A.

The casing encompasses hollow supporting column 17 which extends downwardly to a base, not shown, and terminates upwardly in the kerfed surface shown, that supports the bearing clamp plate shown.

Suitably fixed concentrically to the upper end of the drive-shaft is a sweep arm 18. To the inner face of this sweep arm is fixed a generally circular plate 19 for carrying a single roller 22 mounted on an axle 20 protruding radially from a locus on its periphery. The roller 22 is constructed with a cylindrical wearing surface constituted by a polytetrafluoroethylene (Teflon) tire or other suitable electrically non-conductive material.

The annular kerf shown in the upper face of column 17 is fitted with an annular reed-support 23. On the upper face of the reed-support, which terminates inwardly short of the plate 19, there is disposed a plurality of cantilever contact-reeds 25, radiating outwardly from the common geometrical center 13, and held in place by clamp 24.

Each of these reeds is of course electrically conductive, and, as shown in FIGS. 5 and 6, each reed is hemi-cylindric, and semi-circular in cross-section; that is, the reeds are "half-round," with the flat sides facing upwardly and the rounded sides facing downwardly so as to establish single-line contact with an annular bus bar 27. Preferably, the upper, peripheral edge of this bar bears a raised surface or bead 28 for, among other things, minimizing the area of contact. The bus bar is mounted in a cut-out or kerf in the inner, upper edge of 23. The bead 28 may be separately applied and is composed of a palladium-platinum alloy.

Thus, the downwardly-facing cylindric surfaces of the half-round reeds are constrained to make tangential or substantially point contact with the bead 28.

As shown in FIG. 2, a plurality of signal-leads or plugs 29, varying from 20 to 20,000 in number, are provided to feed into the device a multiplicity of electrically transmitted data to be programmed out by this switch, each lead conveying a discrete item of data and each being connected to a single, separate reed.

For feeding out the switched input signals according to program, a single output terminal 30 is provided. It engages in the annular bus bar 27 and is adapted to successively pickup therefrom the signals as the reeds contact the bead 28 when successively urged, or successively closed by the revolving roller and sweep arm.

Reeds 25 are of course here arranged in single deck conformation and the single roller constitutes the device a single-pole type of switch, broadly considered.

In FIG. 3 there is depicted a single deck, single-pole arrangement. This variant includes an electric drive motor 32 energized through a conductor path 33, the motor driving a drive-shaft 34 that carries a sweep-arm 35. One end of arm 35 bears a guide roller 37 and the opposite end bears an insulated, preferably beaded, contact roller 38. An annular supporting track 39 is provided for the guide roller. Both rollers are electrically non-conductive.

Half-round, or hemi-cylindric, conductive reeds 25 are disposed as before and function as before. They are carried by a supporting ring 42, to which they are clamped by an annular clamping member 42A. An annular contact-and-supporting ring 43, a complete integral circle, is provided for the reeds and is provided underneath same, here. A bead 28 of platinum-palladium alloy, as before, is provided on the upper, inner periphery of the bus bar.

A plurality of signal lead-ins 44, here about 20 to 20,000 in number, is provided. Each lead, as before, feeds a discrete item of data to be programmed to the switching device, in the form of an electrical signal, from an oscilloscope 45 at which one can observe the switching pulse, and a single lead-out 47 from the device 45, feeds the switched data back to a computer, tabulator, or the like, not shown.

The construction shown in FIG. 4 includes a double deck, double pole arrangement for handling two separate programming operations simultaneously.

As before, the two superimposed decks C and D of the switch are synchronously driven by a common drive-shaft 48, and each deck comprises a double-pole switch arrangement. That is, rather than employing a contact roller and a guide roller on the sweep arm, the sweep-arm 35A here carries a contact roller at each end thereof and the bus member 43A of each deck is in the form of two semi-circular pieces.

Otherwise, the construction of each deck in FIG. 4, as well as the drive means, the feed-in signals source and the feed-out means or programming means, is the same as in FIG. 3.

In FIG. 5, an arrangement is shown that, although not necessarily preferred, is usable in any form of the switch. By these particular means, roller 22 makes the next ensuing contact occur between a reed and the bead 28 before the previous connection has been interrupted. To this end, the reeds and the bead are so related that, no reed returns to its retracted, or normal position, out of the path of the progressing roller, before the next circularly succeeding reed is urged downwardly. Of course, the ratio of the high "natural period" of the reeds to the ultra high switching rate is of the essence here. However, the reeds here are arranged closely together and the roller is of relatively large diameter. Or, either one of these expedients may be employed alone, so that the roller does not lose contact with one reed before reaching another.

In FIG. 6 there is depicted a "break-before-make" arrangement, usable in any species, and in which the reeds are somewhat more widely spaced apart and the roller is relatively small, or either factor may be employed alone, to the end that the roller loses contact with one reed before contacting the next one.

A typical production, or commercial article incorporating the invention is shown in FIG. 7, and embodying a double deck, double-pole switch unit, as in FIG. 8, and a drive-motor 32, all being encased in an upright casing 50 mountable upright by means of the base shown. The upper end of the casing is substantially open but covered by a glass cover 51.

In FIG. 8, the two-pole type of switch construction is embodied in a single deck to provide a more compact machine for use where space is at a premium and where not so many items or signals need switching or programming as do those in FIG. 4. The construction and operation of this single-deck, two-pole switch are the same as those of either one of the two decks of FIG. 4.

Although certain specific terminology has been employed in the detailed description of the elements of construction, it is to be understood that such specificity has been resorted to mainly in order to render the description more concrete. It in no wise constitutes the invention, or a limitation upon same, except as required by a just interpretation of the attached claims which actually define the scope of the invention.

I claim:

1. A switch, comprising: a rotatably supported drive shaft; means for rotating said shaft; a pair of longitudinally spaced radially extending arms carried by said shaft; each arm carrying a pair of pressure rollers spaced longitudinally apart thereon; a set of circularly arranged, radially extending electrical contacts disposed in juxtaposition to each of said arms and to the peripheries of said rollers; a bus disposed in juxtaposition to each of said first sets of contacts, said bus being generally annular and divided into semicircular halves so as to constitute a double-pole switch-bus; a signal input lead connected to each contact in the first-said set; and a signal lead out terminal connected to each half of the bus.

2. A switch, comprising: a rotary driving shaft; rotor means revolved by said shaft; a circular dielectric pressural member carried by said rotor; a plurality of radially extending electrical contact members circularly disposed and circumferentially spaced apart in a plane adjacent the pressural member for successive displacement out of said plane by pressure of said pressural member against said radially extending contact members; a bus disposed co-extensively adjacent the inner ends of said circumferentially spaced contact members for successive engagement thereby; said bus including a peripheral ridge confronting said contact members; said contact members each having a longitudinally extending ridge confronting the ridge of said bus whereby to enable the pressural action of said pressural member on said contact members to establish only tangential or substantially point-contact engagement between said contact members and said bus, thereby to minimize noise upon occurrence of said engagement and to obviate arcing upon cessation of said engagement; signal input means connected to each one of said plurality of contact members; and a signal lead out connected to said bus.

3. A switch according to claim 2 in which said rotor means consists of a pair of rotors, the two rotors constituting the pair being spaced apart longitudinally along the length of said shaft, each of said spaced rotors carrying a pressural roller thereon; a pair of contact sets each consisting of a plurality of radially extending electrical contact members circumferentially spaced apart and each set of the pair lying in a plane adjacent the path of revolution of a corresponding roller; said contact members being grouped into a plurality of groups or sets, there being a generally annular bus for each set of said circumferentially spaced contacts; and there being a signal input lead connected to each contact of each of the two sets of circumferentially spaced contacts; and a signal lead out connected to each bus.

4. A switch in accordance with claim 2, in which the bus consists of a pair of substantially semi-circular coplanar halves, there being a signal lead out connected to each bus half.

5. A switch according to claim 2, in which said rotor means carries, at a diametrically opposite portion thereof from said pressural roller, a guide roller, there being a track for said guide roller disposed in contiguity therewith.

References Cited in the file of this patent

UNITED STATES PATENTS

| | | |
|---|---|---|
| 1,031,863 | Palmer | July 9, 1912 |
| 2,184,611 | Cobbett | Dec. 26, 1939 |
| 2,462,033 | Yardeny | Feb. 15, 1949 |
| 2,501,431 | Ausman et al. | Mar. 21, 1950 |
| 2,528,345 | De Champs | Oct. 31, 1950 |
| 2,852,636 | Block et al. | Sept. 16, 1958 |

FOREIGN PATENTS

| | | |
|---|---|---|
| 254,793 | Great Britain | July 7, 1926 |
| 1,216,915 | France | Dec. 7, 1959 |